March 28, 1944.                J. D. BOLESKY                2,345,451
                                  SWITCH
                           Filed Aug. 30, 1941           3 Sheets-Sheet 1
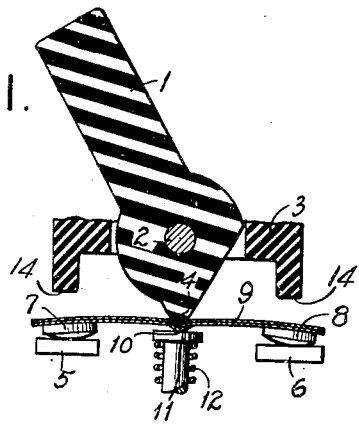
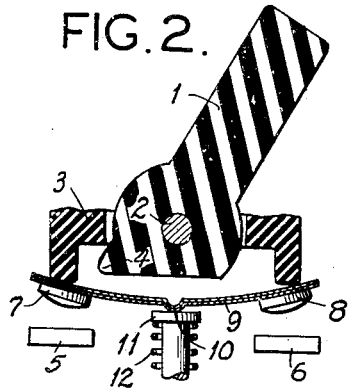
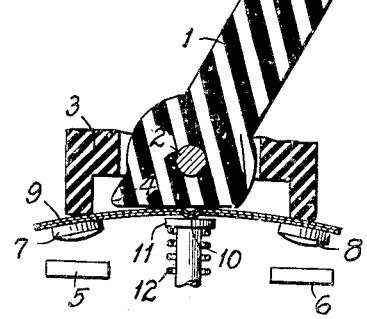
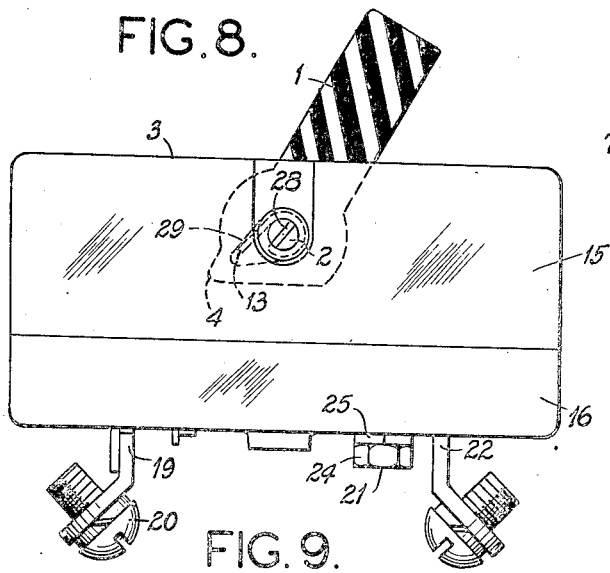
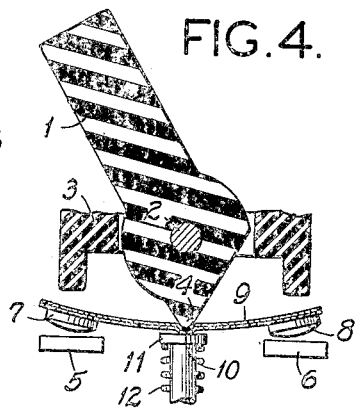
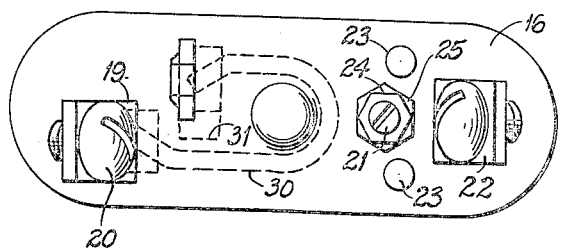

March 28, 1944.  J. D. BOLESKY  2,345,451
SWITCH
Filed Aug. 30, 1941  3 Sheets-Sheet 2

John D. Bolesky
Inventor
Haynes and Koenig
Attorneys

March 28, 1944.  J. D. BOLESKY  2,345,451
SWITCH
Filed Aug. 30, 1941  3 Sheets-Sheet 3

John D. Bolesky
Inventor
Haynes and Koenig
Attorneys

Patented Mar. 28, 1944

2,345,451

UNITED STATES PATENT OFFICE 2,345,451

SWITCH

John D. Bolesky, Attleboro, Mass., assignor to Metals & Controls Corporation, Attleboro, Mass., a corporation of Massachusetts Application August 30, 1941, Serial No. 409,917

12 Claims. (Cl. 200—113)

This invention relates to thermostatic circuit breakers, and in particular to thermostatic circuit breakers which are also manually controlled switches.

Among the several objects of this invention are the provision of a thermostatic switch which is adapted to interrupt an electrical circuit automatically on a rise of current injurious to the circuit, and which either automatically recloses or requires manual resetting; the provision of a manual-reset thermostatic switch of the class described in which the circuit breaker mechanism is trip-free of the resetting handle; the provision of an electrical switch of the class indicated which includes a pressure chamber which tends to snuff out any incipient arc formation during the opening of the electrical contacts; the provision of a switch of the class referred to which includes means for manually opening the circuit, as well as closing the circuit; the provision of a thermostatic switch of the class described which has a simple latching device; the provision of a thermostatic switch of the class described in which the action of the thermostatic element is used to release means whereby the element itself is moved into circuit-open position, also one in which if the reset means is held in the circuit-closed position, the action of the thermostatic element per se is used to interrupt the electrical circuit; and the provision of a switch of the class indicated which is simple, economically constructed, and reliable and efficient in operation. Other objects will be in part obvious and in part pointed out hereinafter.

The invention accordingly comprises the elements and combination of elements, features of construction, and arrangement of parts which will be exemplified in the structures hereinafter described, and the scope of the application of which will be indicated in the following claims.

In the accompanying drawings, in which are illustrated several of various possible embodiments of the invention, Fig. 1 is a section through the actuating mechanism of a switch embodying the present invention;

Fig. 2 is a view similar to Fig. 1, but showing the mechanism in a second position;

Fig. 3 is similar to Fig. 1, but shows the mechanism in a third position;

Fig. 4 is similar to Fig. 1, but shows the mechanism in a fourth position;

Fig. 8 is a side-elevation of the Fig. 5 switch;

Fig. 9 is a bottom-plan view of another embodiment of the present invention;

Similar reference characters indicate corresponding parts throughout the several views of the drawings.

Figure 5:
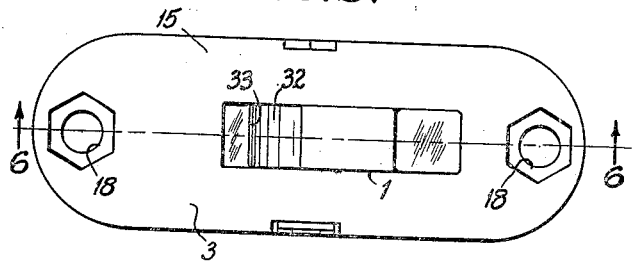
Fig. 5 is a top-plan view of a switch embodying the present invention.

The present invention concerns electrical switches which combine in a single switch a thermostatic circuit-breaker and a manually actuable "on"-"off" switch. While such switches can be used for many purposes, their primary purpose is to act as protectors of electrical circuits when the current in the circuit rises to a value injurious to the circuit. They also can be used as "on"-"off" manually actuated switches to control the circuit.

In accordance with the present invention, the switch shown is operable manually to open and close a circuit, and is also responsive to excessive currents to open the circuit automatically, independently of the operating handle.

The switch preferably uses for its thermally responsive means a snap-acting thermostatic element, such as that shown in Spencer Patent 1,448,240, or a snap-acting plate which is shaped so as inherently to provide its snap action within itself without the use of any additional toggles or over-center springs, etc. By the use of such a snap-acting device, a quick separation of the contacts is assured automatically under all operating conditions. Also, by the use of snap-acting thermal means the latching means is held more positively in engagement against sudden jar or shock than when thermal strips of the slow-motion type are used for latching purposes.

Some of the advantages of the construction of the present invention will become apparent if reference is made to Figs. 1 to 4 inclusive, wherein the various sequential operations of this embodiment of the mechanism are shown. Referring to Fig. 1, a switch handle 1 is shown rotatably mounted on shaft 2 which is fixed in base 3 (shown in fragmentary part). Operating handle 1 has a cam-shaped spur 4. Stationary contacts 5 and 6 mounted on the base of the switch are engaged by cooperating contacts 7 and 8, which are welded, or otherwise fastened to make good electrical connection with a thermostatic snap-acting plate 9, such as is shown, for example, in Patent 1,448,240. Snap-acting plate 9 has a depression 10 formed therein at the center into which the spur 4 fits when the handle 1 is in the position shown in Fig. 1. A plunger 11 slidably engaged in the base of the switch serves as a support for the thermostatic plate 9 at the center thereof, said plunger 11 being urged upwardly from the base by spring 12. The position of the parts shown in Fig. 1 is the circuit-closed position, the operating handle 1 being held in its counterclockwise position because of the engagement of spur 4 with the depression 10. A spring 13 (see Fig. 8) tends to urge the handle 1 in a clockwise direction, to the position shown in Figs. 2 and 3. However, this motion is resisted by the engagement of spur 4 and depression 10.

The plate 9 has had its center depressed slightly by the spur 4 and the natural spring of the plate 9 resists this depressing, exerting a presssure sufficient to hold the spur 4 in the notch 10.

Assuming now that excessive current flows through the circuit so that the snap-acting plate 9 is heated to its snapping point, and reverses shape, as it does so the snap action lifts the contacts 7 and 8 away from contacts 5 and 6, releasing the pressure of the plate 9 against the spur 4 and thus permitting spur 4 to slip out of notch 10 and handle 1 to be rotated by spring 13 to the Fig. 2 position. The sudden action of the plate 9 in lifting its extremities and the contacts 7 and 8 mounted thereon reacts to force the center of plate 9 downward, overcoming momentarily the force of spring 12 and aiding in the release of spur 4 from notch 10. This is also aided somewhat by the freedom of the plate 9 to tip when the contacts have separated. Spring 12 is allowed by the movement of handle 1 to the Fig. 2 position to push the snap-acting plate 9 to the position shown in Fig. 2 where the outer portions of the snap-acting plate strikes the stops 14 of the base, the plate 9 being in its reverse shape, assumed when hot. This action effectively disengages the respective contacts 5 and 7, and 6 and 8 with a wide contact opening to aid in rupturing heavy currents with minimum contact damage. When the plate cools, its shape is again reversed and the center of the plate snaps upward as shown in Fig. 3, the plate being held in its upward position by the spring 12. To reset the device, all that then is necessary is to move handle 1 in a counterclockwise direction to the Fig. 1 position, upon which the cam shape of spur 4 will push the snap-acting plate downward until the contacts are engaged and upon further movement, the spur 4 will engage the depression 10, thus holding the handle in the position shown in Fig. 1. If excessive currents remain in the circuit, the cycle will be repeated.

If, while plate 9 is in the Fig. 2 position, an attempt is made to reset the device by moving handle 1 to its Fig. 1 position, the resulting situation is shown in Fig. 4. Since plate 9 is still in its reverse shape contacts 5 and 7, and 6 and 8 are not engaged and the circuit remains broken. Only after plate 9 has returned to its Fig. 1 shape is it possible to reclose the circuit.

It will be noted that if the handle 1 is held in the Fig. 1 position, the snap-action of the plate 9 into its hot shape opens the contacts as shown in Fig. 4. Thus the electrical circuit is interrupted by the action of the thermostatic plate 9 itself. Consequently, the circuit breaker function of the device is entirely trip-free of the handle 1 in case the latter should become jammed or held in its circuit-closing position. It will be noted that when the operation is allowed to occur in its normal manner, the action of the thermal means allows the handle to move from its Fig. 1 position to the Fig. 2 position. This means that a positive indication of opening is given when the circuit breaker has operated. It will be further observed that this mechanism is essentially a very simple one and thus lends itself readily to manufacture, ease of calibration, and long life.

Figure 6:
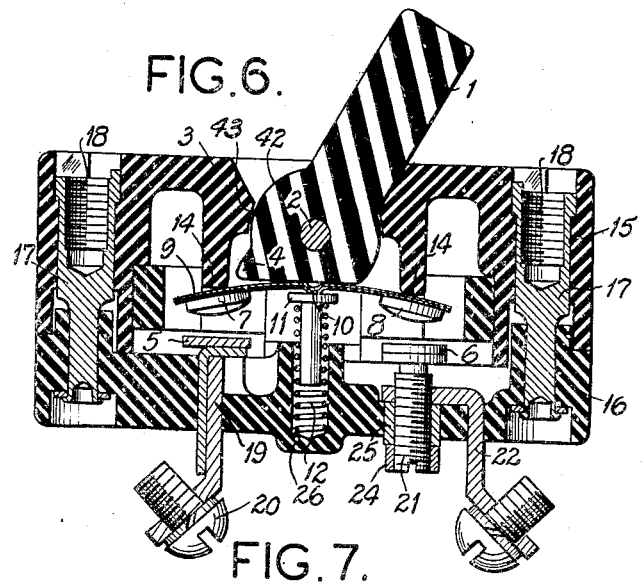
Fig. 6 is a section taken along line 6—6 of Fig. 5.
Figure 7:
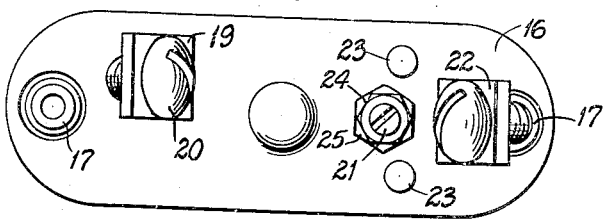
Fig. 7 is a bottom-plan view of the Fig. 5 switch.

Referring now to the other drawings, for the construction of a switch embodying these principles, Fig. 6 shows a base made of a material, such as Bakelite, for example, having good electrical insulating properties and comprising two parts 15 and 16. The parts 15 and 16 are held together by means such as rivets 17 in the customary manner. Rivets 17 have a threaded hole 18 therein to facilitate mounting the device on a switchboard panel, etc. Handle 1 is also made of insulating material such as Bakelite. Stationary contact 5 is shown mounted on a terminal piece 19, which extends through and is clinch fitted to the base 16 and is provided with a terminal screw 20 to facilitate electrical connection therewith. Stationary contact 6 is shown mounted on adjusting screw 21 which is threaded into terminal plate 22. Terminal plate 22 is held by means of rivets 23 to the base 16, and is also provided with a terminal screw 20 to facilitate electrical connection therewith. A lock-nut 24 engaging a collar 25 which in turn engages the plate 22, serves to hold the adjusting screw fixed in whatever position it is set. The spring 12 fits into a hole 26 in the base 16. The plunger 11 comprises a flat top part, a shoulder against which spring 12 reacts, and an elongated part, the elongated portion being provided to guide the plunger in the hole 26.

The stops 14 are molded as an integral part of the base portion 15 and serve the motion-limiting purpose explained above. If desired, a luminous signal or "jewel" may be provided at the end of the handle so that in case of darkness, the position of the handle will be clearly indicated.

It will be thus noted that the contacts and thermal mechanism are mounted in an enclosed space which is small in size, thus providing a pressure chamber and any heat caused by excessive sparking will tend to cause the pressure to rise inside this space, thus tending to snuff out the arc.

The spring 13, used to tension the handle 1, is shown dotted in Fig. 8. It is attached and mounted in this fashion: The pin 2 on which the handle 1 rotates is slotted for a short part of its length as at 28. A spiral torsional spring 13 has its inner end held in slot 28. The outer end of spring 13 engages a recess 29 in the handle 1. Thus, the torsional spring 13 is anchored at one end by means of the pin 2 to the base 15, and the other end of the torsional spring serves to actuate the handle 1 in a clockwise direction when the switch arm is released.

It may be desirable in some applications to use an auxiliary heater element in the switch instead of relying upon the current passing only through the snap-acting plate itself. Fig. 9 shows an arrangement of terminals and a heater 30 to accomplish this purpose. Heater 30 is connected between terminal 19 and a contact plate 31. The contact 5 is secured to this contact plate 31. In this case, the current would enter, for example, at terminal 19, traverse the heater 30 (conductively attached at one end to terminal 19, and at the other end to contact plate 31), through contact 5, snap-acting plate 9, and out through terminal 22.

It will be observed that in the construction of the switch, the parts are reduced to a minimum number, the working parts are extremely simple, and because of this the device has a relatively long life, is easy to manufacture, and may be economically constructed.

The handle 1 is preferably provided with a rounded portion 42 which, together with the conforming molded portion 43 of the base part 15, serves to keep any arc flash or extremely high current short circuits, from escaping from the interior of the switch, and also gives a tight closure for a pressure chamber effect.

Figure 10:
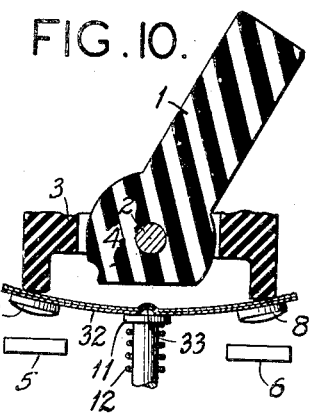
Fig. 10 is a view similar to Fig. 2, but showing a different actuating mechanism.

The snap-acting plate may, instead of having a depression, be formed as shown at 32 in Fig. 10, with a raised portion 33. In this instance handle 1 will be on the side of portion 33 opposite to that on which it is in Fig. 10, when the handle is in its Fig. 1 position. If desired, cam portion 4 may be formed with a groove to engage portion 33.

Figure 11:
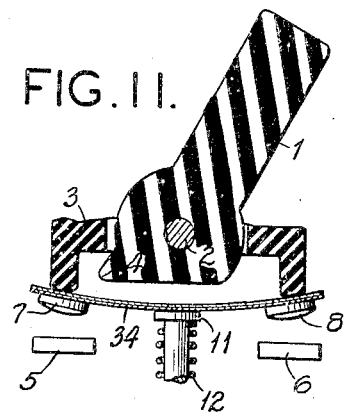
Fig. 11 is another view similar to Fig. 2, but showing a still different actuating mechanism.

A still further variation is shown in Fig. 11. Here the snap-acting plate 34 has neither a depression nor a raised portion. If handle 1 is arranged so that the cam portion 4 passes over dead center, the device will operate in the same manner as the previously-described embodiments. If the handle is arranged so the cam portion 4 does not pass over dead center, a momentary contact switch will be obtained which will break the circuit as soon as handle 1 is released.

Figure 14:
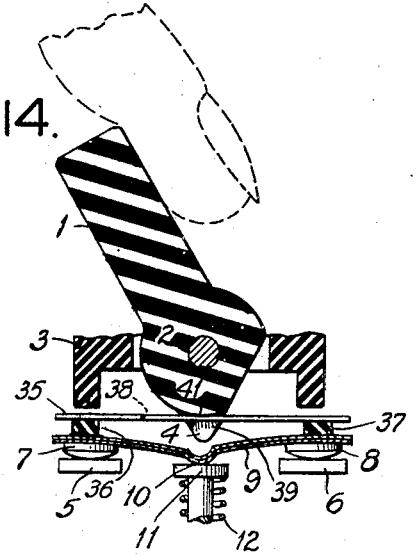
Fig. 14 is a view of the Fig. 12 mechanism in a different position.
Figure 15:
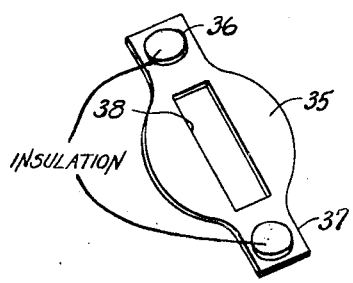
Fig. 15 is a perspective of one of the elements of the Fig. 12 mechanism.

A still further embodiment of the present invention is shown in Figs. 12-15. The device in this instance has been made completely manually controllable. This is accomplished, for example, by means of the resilient metallic plate 35. This is located between the snap-acting plate 9 and the framework of the device. Plate 35 has insulating buttons 36 and 37 attached thereto. These are positioned over the movable contacts 7 and 8 respectively. The shape of plate 35 is shown in Fig. 15. It has a central opening 38 adapted to allow the projecting central portion 39 of cam 4 to pass therethrough (see particularly Fig. 13).

It will be noted that cam 4 has shoulders 40 and 41 on either side of projecting portion 39. These contact the central portion of plate 35.

The operation of the Figs. 12-15 embodiment is similar to that of the Figs. 1-4 embodiment, except that it is not trip-free of handle 1. This is illustrated particularly by Fig. 14. The shoulders 40 and 41, contacting the central portion of plate 35, as illustrated in Fig. 14, press down the outer edges of plate 9, and keep the contacts 7 and 5 and 8 and 6 together. The insulating portions 36 and 37, it will be noteed, are positioned to carry out this operation most effectively, lying, as they do, directly above movable contacts 7 and 8.

Figure 12:
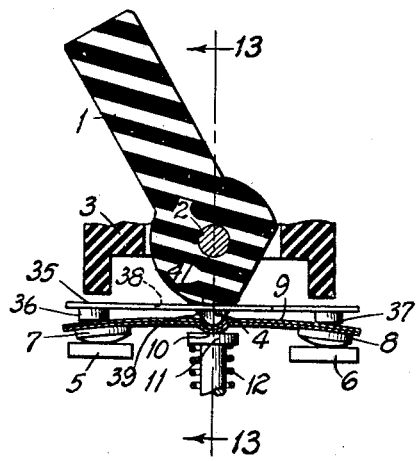
Fig. 12 is a view similar to Fig. 1, but showing a different actuating mechanism.
Figure 13:
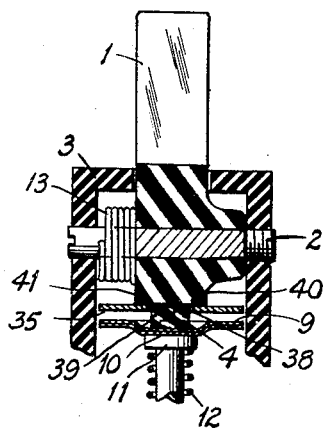
Fig. 13 is a section along the line 13—13 in Fig. 12.

If, therefore, the handle 1 is manually kept in the Figs. 12 and 14 position, the snap-acting disc 9 cannot separate the contacts even though it snaps to its hot position. On the other hand, the plate 9 is still free to assume its hot position by snapping downward against spring 12, and is therefore not under such restraint as might change its calibration. If the handle 1 is not held in the Figs. 12 and 14 position, the operation of this embodiment is the same as that of the Figs. 1-4 embodiment.

If spring 13 is reversed an automatically resetting circuit breaker is obtained. The spring 13 is preferably retained and reversed, rather than eliminated, since it overcomes gravity which, when the switch is mounted in certain positions, would otherwise tend to make the operation of the device less reliable.

The detents such as cam portion 4 and depression 10 described above merely exemplify the various types of latching means which may be employed. Other forms of detents can be substituted.

Although snap-acting thermostatic elements have been used in the devices described above, strip-type or other creep-acting thermostatic elements may be used in lieu thereof.

In view of the above, it will be seen that the several objects of the invention are achieved and other advantageous results obtained.

As many changes could be made in the above constructions without departing from the scope of the invention, it is intended that all matter contained in the above description or shown in the accompanying drawings shall be interpreted as illustrative and not in a limiting sense.

What is claimed is:

1. A switch comprising a line terminal, a terminal-engaging element, thermostatic means responsive to temperature change to change shape for moving said terminal-engaging element, a movable support for said thermostatic means for moving the latter into a first or second position with respect to said line terminal, whereby in said first position the thermostatic means when it changes position in response to temperature change is adapted to move the terminal-engaging element from engaging to disengaging position, and when said thermostatic means is in said second position to move said terminal-engaging element to either of two positions, neither of which contacts the line terminal, manual means, and cooperative cam means directly connecting between the manual means and the thermostatic means for moving the thermostatic means into said first position in response to movement of the manual means, said cooperative cam means being so formed that action of the thermostatic means in response to temperature rise when in said first position permits movement of the manual means to a position wherein the thermostatic means may move to said second position.

2. A switch comprising a line terminal, a terminal-engaging element, thermostatic means responsive to temperature change to change shape for moving said terminal-engaging element, a movable biased support for said thermostatic means for moving the latter from a first to a second position with respect to said line terminal, whereby in said first position the thermostatic means when it changes position in response to temperature change is adapted to move the terminal-engaging element from engaging to disengaging position with respect to the line terminal, and when said thermostatic means is in said second position to move said terminal-engaging element to either of two positions, neither of which contacts the line terminal, manual means, and cooperative means including a cam operating directly between the manual means and the thermostatic means for moving the terminal-engaging element into engaging position in response to one movement of the manual means, irrespective of whether the thermostatic means is in hot or cold position, said manual means and cam when moved to another position permitting the thermostatic means under the bias to move to said second position wherein it may move to its hot or cold position without engagement between the terminal-engaging element and line terminal.

3. A switch comprising a line terminal, a terminal-engaging element, thermostatic means responsive to temperature change to change shape for moving said terminal-engaging element, a movable biased support for said thermostatic means for moving the latter from a first to a second position with respect to said line terminal, whereby in said first position the thermostatic means when it changes position in response to temperature change is adapted to move the terminal-engaging element from engaging to disengaging position, and when said thermostatic means is in said second position to move said terminal-engaging element to either of two positions, neither of which contacts the line terminal, and cooperative cam and pressure means between the manual means and the thermostatic means for moving the terminal-engaging element into engaging position in response to one movement of the manual means irrespective of whether the thermostatic means is in hot or cold position.

4. A switch comprising a line terminal, a terminal-engaging element, thermostatic means responsive to temperature change to change shape for moving said terminal-engaging element, a movable biased support for said thermostatic means for moving the latter from a first to a second position with respect to said line terminal, whereby in said first position the thermostatic means when it changes position in response to temperature change is adapted to move the terminal-engaging element from engaging to disengaging position, and when said thermostatic means is in said second position to move said terminal-engaging element to either of two positions, neither of which contacts the line terminal, and cooperative means including a cam operating directly between the manual means and the thermostatic means for moving the terminal engaging element into engaging position in response to one movement of the manual means only when the thermostatic means is in cold position.

5. A switch comprising a line terminal, a terminal-engaging element, thermostatic means responsive to temperature change to change shape for moving said terminal-engaging element, a movable biased support for said thermostatic means for moving the latter from a first to a second position with respect to said line terminal, whereby in said first position the thermostatic means when it changes position is adapted to move the terminal-engaging element from engaging to disengaging position, and when said thermostatic means is in said second position to move said terminal-engaging element to either of two positions, neither of which contacts the line terminal, manual means and cooperative means including a cam operating directly between the manual means and the thermostatic means for moving the thermostatic means into said first position in response to movement of the manual means, said cooperative means being so formed that action of the thermostatic means in response to temperature rise when in said first position permits movement of the manual means to a position wherein the thermostatic means may move to said second position and means biasing the manual means toward said last-named position.

6. A switch comprising a line terminal, a terminal-engaging element, thermostatic means responsive to temperature change to change shape for moving said terminal-engaging element, a movable biased support for said thermostatic means for moving the latter from a first to a second position with respect to said line terminal, whereby in said first position the thermostatic means when it changes position in response to temperature change is adapted to move the terminal-engaging element from engaging to disengaging position with respect to the line terminal, and when said thermostatic means is in said second position to move said terminal-engaging element to either of two positions, neither of which contacts the line terminal, manual means, and cooperative means including a cam operating directly between the manual means and the thermostatic means for moving the terminal-engaging element into engaging position in response to movement of the manual means, only when the thermostatic means is in cold position, said manual means when moved to another position permitting the thermostatic means to move to said second position wherein it may move to its hot or cold position without engagement between the terminal-engaging element and line terminal.

7. A switch comprising a line terminal, a terminal-engaging element, thermostatic means responsive to temperature change to change shape for moving said terminal-engaging element, a movable biased support for said thermostatic means for moving the latter from a first to a second position with respect to said line terminal, whereby in said first position the thermostatic means when it changes position in response to temperature change is adapted to move the terminal-engaging element from engaging to disengaging position with respect to the line terminal, and when said thermostatic means is in said second position to move said terminal-engaging element to either of two positions, neither of which contacts the line terminal, manual means, and cooperative means including a cam operating directly between the manual means and the thermostatic means for moving the terminal-engaging element into engaging position in response to movement of the manual means, irrespective of whether the thermostatic means is in hot or cold position.

8. In a thermostatic control, base contacts, a snap-acting flexible thermostatic plate of current-conducting material, said plate having a normally flexed shape and an oppositely flexed shape, contacts on the plate adapted to engage said base contacts, said engagement being determined by the position of said plate in respect to said base contacts and by the flexed shape of the plate, manually movable latch means movably mounted and adapted in one position to bear on said plate to move and position the plate to close said contacts when said plate is in its normal flexed shape, said latch comprising detent means between the latch and the plate so formed that movement of said plate toward said base contacts is necessary in order to release said latching means for movement to another position.

9. In a thermostatic switch, a base, stationary contacts on the base, a flexible snap-acting thermostatic plate of current-conducting material, said plate having a normally flexed shape and an oppositely flexed shape, contacts on the plate adapted to engage said stationary contacts, said engagement being determined in part by the position of said plate in respect to said stationary contacts and in part by the flexed shape of the plate, a manually movable latch means pivotally mounted and adapted in one position to bear on said plate to move said plate into position to close said contacts when said plate is in its normal flexed shape, comprising detent means between the latch and the plate so formed that while the contacts are closed thermostatic flexure of the plate toward said oppositely flexed shape is necessary in order to release said latching means, means biasing said latching means away from the detent position when said last-named movement of the plate occurs, a means for biasing the plate in the direction to hold the latch in its detent position before said last-mentioned movement occurs and to push the plate to its open contact position after said last-named movement has occurred and after the latch has moved to its biased position.

10. In a thermostatic switch, a base, stationary contacts on the base, a flexible snap-acting thermostatic plate of current-conducting material, said plate having a normally flexed shape and an oppositely flexed shape, contacts on the plate adapted to engage said stationary contacts, said engagement being determined in part by the position of said plate in respect to said stationary contacts and in part by the flexed shape of the plate, a manually movable latch means pivotally mounted and adapted in one position to bear on said plate to move said plate into position to close said contacts when said plate is in its normal flexed shape, comprising detent means between the latch and the plate so formed that while the contacts are closed thermostatic flexure of the plate toward said oppositely flexed shape is necessary in order to release said latching means, means biasing said latching means away from the detent position when said last-named movement of the plate occurs, a means for biasing the plate in the direction to hold the latch in its detent position before said last-mentioned movement occurs and to push the plate to its open contact position after said last-named movement has occurred and after the latch has moved to its biased position, said latch being returnable to detent position to move the plate toward the fixed contacts but without closing the contacts as long as the plate is in its said oppositely flexed shape, the contacts of the plate then automatically reclosing when said plate thermostatically returns to its normally flexed shape.

11. A circuit breaker comprising relatively movable contacts, operating means therefor comprising a thermally responsive snap-acting element heated in response to the current of a circuit, means including a pivoted handle manually movable to circuit open and closed indicating positions for moving said element respectively to manually open and close said contacts, detent means operating between said handle and said element and latchable on said element in such a way that motion of said element is necessary to release said detent from latching position, said handle upon release of said detent being biased to move to said circuit open indicating position.

12. A thermostat comprising a base with stationary contacts thereon, a snap-acting thermostatic plate of current-conducting material carrying contacts adapted to engage said stationary contacts, said engagement being determined by the position of said plate in respect to said base, said plate having a normally flexed shape and an oppositely flexed shape, manually movable latching means pivotally mounted and adapted to bear on said plate to close said contacts when said plate is in its normal flexed shape, said latching means engaging a recess in said plate whereby movement of said plate toward said stationary contacts is necessary in order to release said latching means.

JOHN D. BOLESKY.